(No Model.) 3 Sheets—Sheet 2.
H. FRASCH.
DRYING AND ROASTING APPARATUS.
No. 418,315. Patented Dec. 31, 1889.
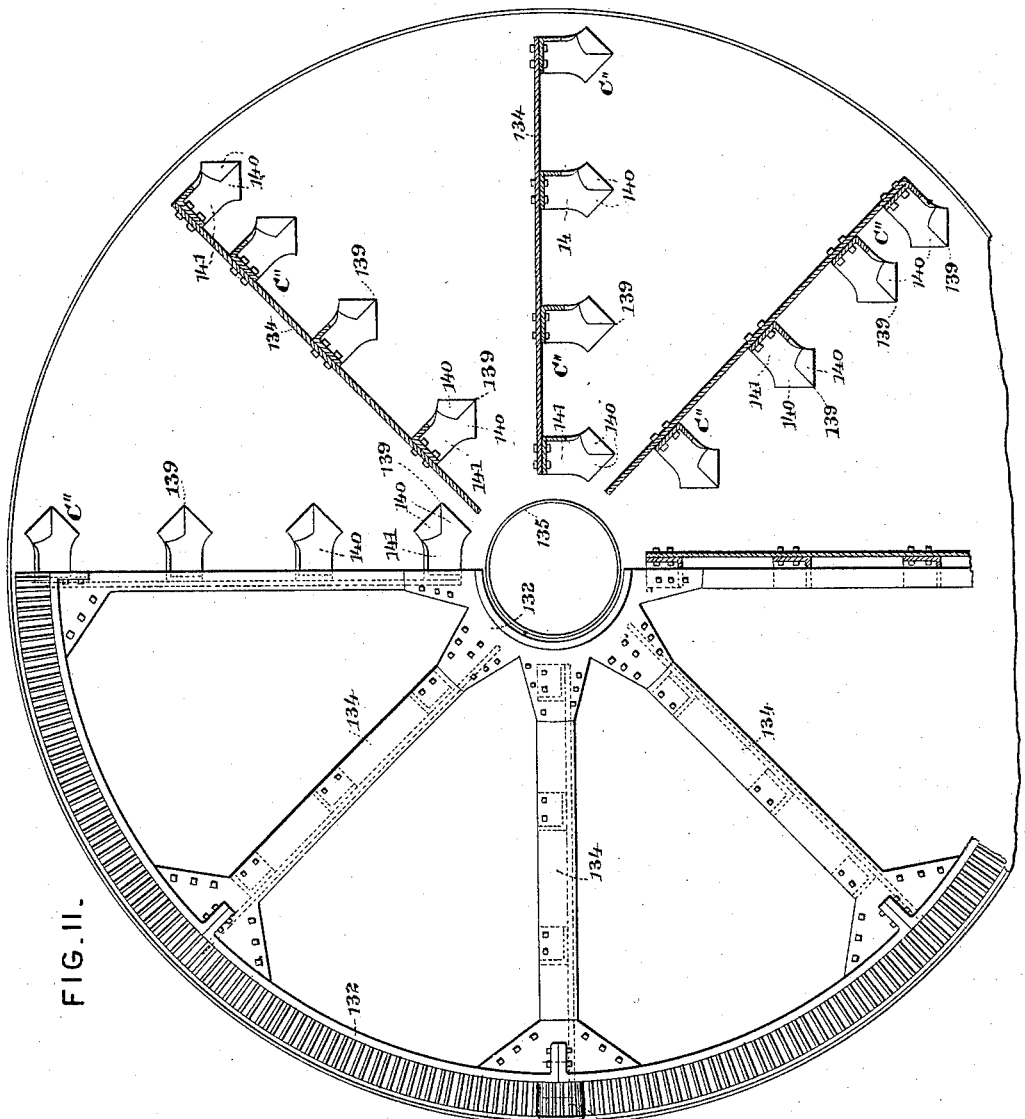
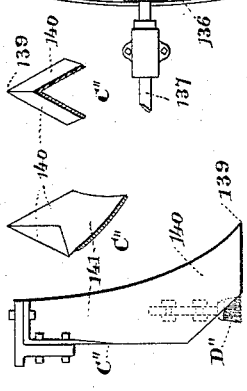

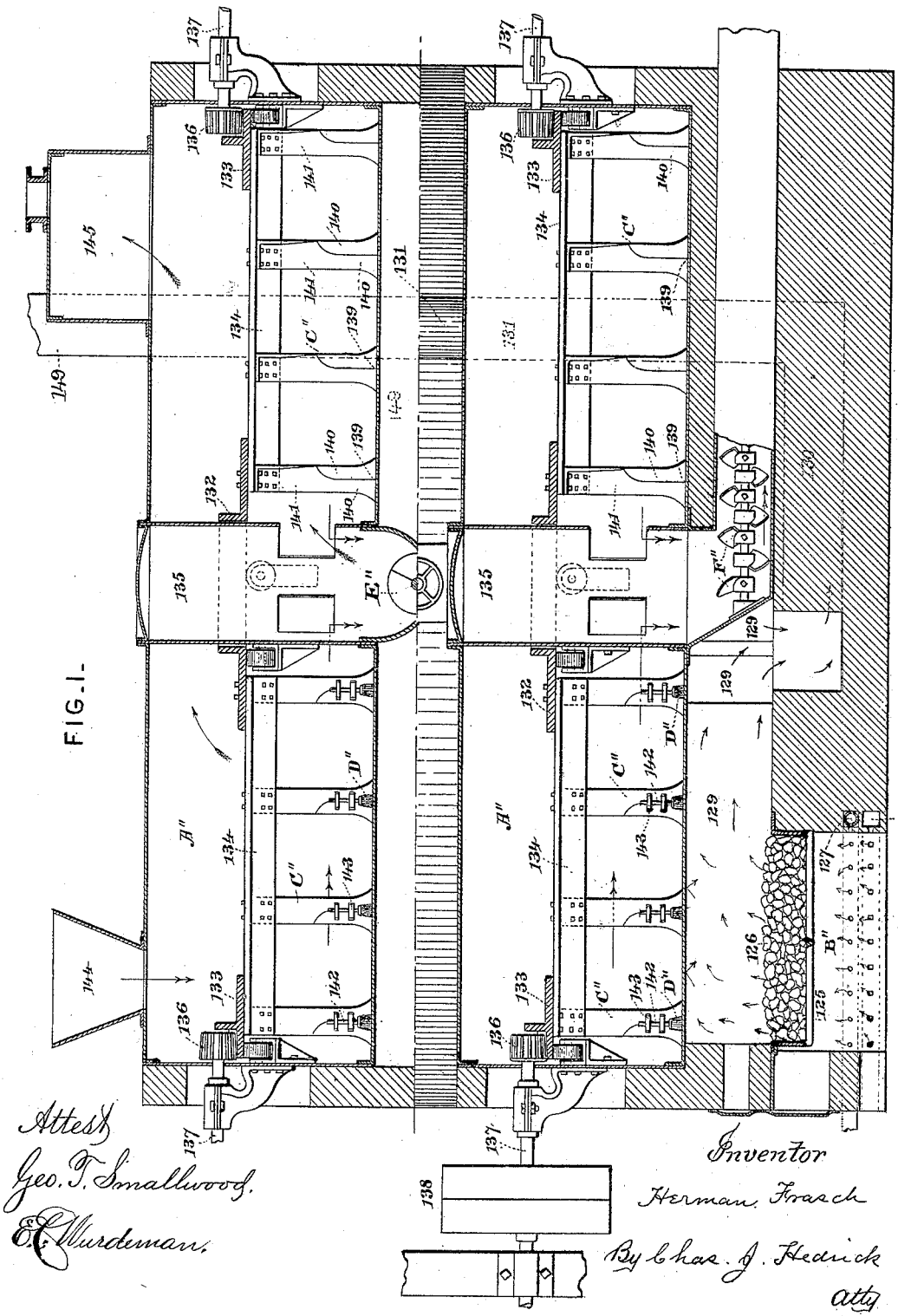

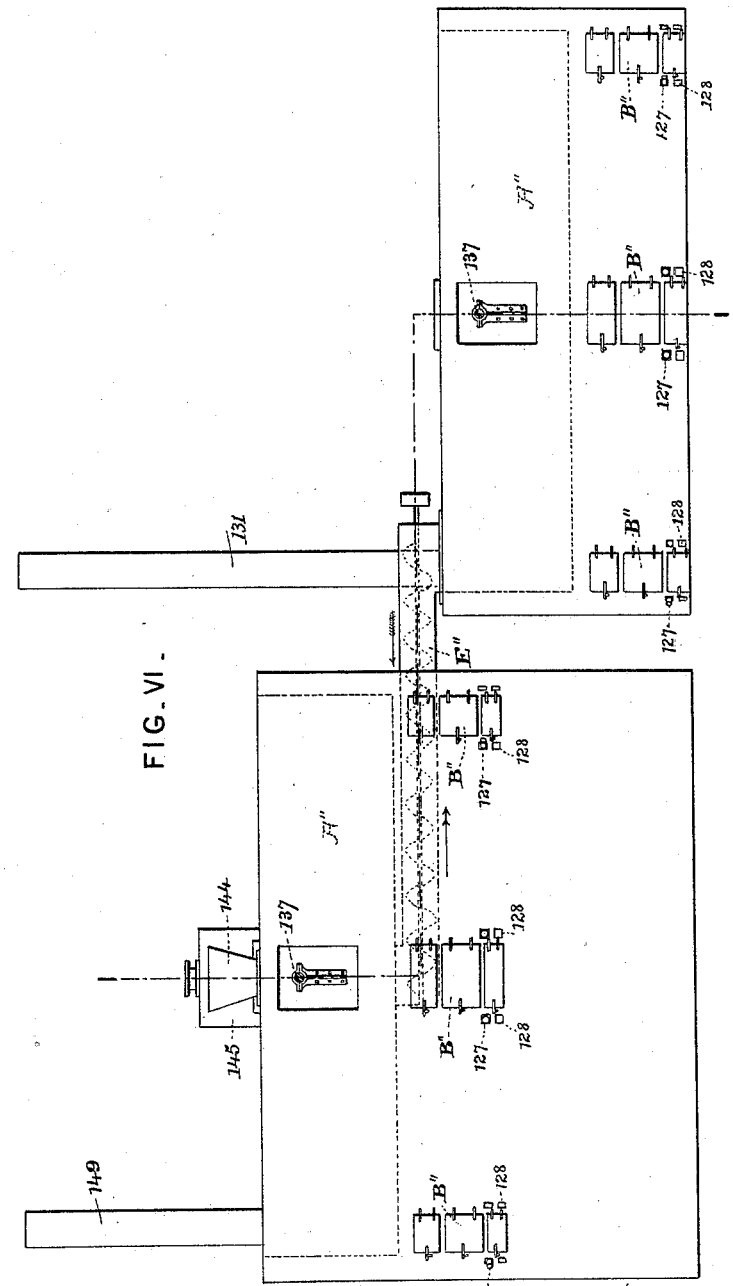

UNITED STATES PATENT OFFICE.

HERMAN FRASCH, OF LONDON, ONTARIO, CANADA.

DRYING AND ROASTING APPARATUS.

SPECIFICATION forming part of Letters Patent No. 418,315, dated December 31, 1889.

Application filed May 10, 1886. Serial No. 201,762. (No model.)

*To all whom it may concern:*

Be it known that I, HERMAN FRASCH, a citizen of the United States, residing at London, in the Province of Ontario, Canada, have invented certain new and useful Improvements in Drying and Roasting Apparatus, of which the following specification is a full, clear, and exact description.

This invention relates more particularly to an apparatus for drying the bicarbonate of sodium precipitated in the ammonia-soda manufacture and separated by filtration from the ammonium-chloride solution and for roasting it to complete its decomposition into monocarbonate of sodium; but it is applicable, at least in part, to the treatment of other substances.

The invention consists in the parts, improvements, and combinations hereinafter particularly pointed out.

The following is a description of what is considered the best mode of applying the principle of the invention, reference being had to the accompanying drawings, which form part of this specification.

Figure I is a vertical section on dotted line II, Fig. VI, of a drier and roaster for bicarbonate of sodium; Fig. II, a plan, one-half sectioned, of the drying or the roasting chamber; Figs. III, IV, and V, detail views of one of the shovels; and Fig. VI is a side elevation of the drier and roaster.

The feathered arrows indicate the flow of escaping gas or vapor and the double-headed arrows the motion of the solid material.

The drying and roasting chambers A'' are substantially alike, as shown. They are set in brick-work, the drying above and at one side of the roasting chamber. Under the roasting-chamber, and also under the drying-chamber, near the circumference thereof, are the fire-places B''. As many of these are used as necessary to heat the bottom of the chambers evenly. As shown, they contain each a grate 125, filled with loose stone 126. A gas-pipe 127 delivers the gas for fuel through numerous holes into the pit below the grate, and the air is supplied from a flue 128 through numerous holes in the wall of the ash-pit. The flames play upon the stones and heat them to a high temperature. The products of combustion from each fire-place are delivered through a flue 129, the top of which is formed by the bottom of the roasting or of the drying chamber into the flue 130, which communicates with the other flues at the center and conveys the products of combustion into the chimney or stack 131 for the roaster and 149 for the drier. In the roasting (and also in the drying) chamber there is a stirrer-frame composed of the rings 132 and 133 and the connecting bars or beams 134. The inner ring 132 surrounds the stationary cylindrical tube 135 and runs upon rollers carried by brackets bolted to said tube. The outer ring 133 runs upon rollers carried by brackets bolted to the inner wall of the chamber. It is provided with cogs or teeth, which are engaged by the bevel-gears 136 on the two shafts 137. The latter are revolved by belts on pulleys 138 and serve to rotate the stirrer-frame. By applying the driving-power to the frame at the periphery instead of to a shaft at the center the danger of twisting off shafts is avoided. The shovels C'' are bolted to the bars or beams 134 and extend into close proximity to the bottom of the chamber. The point 139 is in advance of the shank, and from the middle line running backward and upward from said point the surface slopes away, as shown at 140, on both sides for about half the height of the shovel. For the remaining distance the surface on both sides of the middle line slopes toward the center of the chamber, as shown at 141. (See Figs. IV and V.) The effect is that as the shovel plows its way through the material drying or roasting the inclines 140 lift the same from the bottom of the chamber and turn it off to both sides, while the inclines 141 carry it toward the center. The shovels of course also carry the material around with them. Behind each shovel, in the space between the rings thereof, is a brush D'', having a stem 142, guided by cross-pieces 143, bolted to the wings of the shovel and resting by gravity upon the bottom of the roasting or drying chamber. These brushes or scrapers keep the bottom clean and prevent a crust forming. At the center of the chambers the dried or roasted material escapes through outlet-holes in the tube 135. These outlets are made a distance above the bottom of the chamber, so that a layer of material of considerable depth is kept always in the chamber.

In the ammonia-soda manufacture the moist bicarbonate of sodium is introduced through the hopper 144 into the upper or drying chamber, which is heated to a suitable temperature by the combustion in the fire-places beneath it. The bicarbonate is decomposed into a sesqui-carbonate and then in large part into the monohydrated carbonate. The steam, together with the ammoniacal vapors and carbonic acid, collects in the dome 145 and is carried off by a pipe leading from the top of the same. The comparatively-dry soda is delivered into the screw conveyer E'', which delivers it into the roasting-chamber at the circumference thereof. In this chamber the temperature is so high that the decomposition is completed, the last equivalent of water of crystallization and any remaining carbonic acid being driven off. The gas and vapor pass through the conveyer E'' into the drying-chamber A'' and escape by way of the dome 145. The roasted soda (now sodium monocarbonate) is carried by the conveyer F''' to the outside of the apparatus and delivered into any suitable receptacle. The manner of using the apparatus with other material will be obvious.

It is evident that modifications could be made in details without departing from the spirit of the invention, and parts of the invention could be used separately.

It is not of course essential that there should be two chambers, since one could be used alone for drying or for roasting, or for both drying and roasting.

Having now explained the nature of the invention and the manner in which the same may be carried into effect, what I claim, and desire to secure by Letters Patent, is—

2. The horizontal drying or roasting chamber having the inlet at the periphery and the outlet at the center at a considerable distance above that portion of the bottom of the said chamber which underlies said inlet, in combination with the horizontally-rotating rakes or stirrers arranged at least in part below said outlet, which rakes or stirrers move around said outlet and some of them under the said inlet, so that the fresh material is received upon a considerable bed of material, and as soon as introduced is carried away and distributed over or among a large bulk of material, dried or roasted more or less completely, substantially as described.

2. The combination, with the horizontal drying or roasting chamber having the outlet at a considerable distance above the bottom, of the horizontally-rotating rakes or stirrers having shovels whose lower parts arranged below said outlet project forward and are sloped backward on both sides of their middle line, and whose upper parts arranged above said outlet are inclined to one side, substantially as described.

3. The horizontal drying or roasting chamber provided at the center with a cylindrical tube having outlet-openings therein at a considerable distance above the bottom of the said chamber, in combination with rollers and brackets supported on said tube, a stirrer-frame provided with an inner ring surrounding said tube and running on said rollers, the shovels attached to said frame, and the gearing for rotating the same, substantially as described.

4. The combination, with the horizontal roasting or drying chamber, of the horizontally-rotating stirrer-shovels having wings extending backward and the brushes or scrapers supported each between the wings of one of said shovels and movable with the same and pressing against the bottom of said chamber, substantially as described.

In testimony whereof I affix my signature in presence of two witnesses.

HERMAN FRASCH.

Witnesses:
G. W. HAMMER,
DON W. HARROM.